Figure 1:
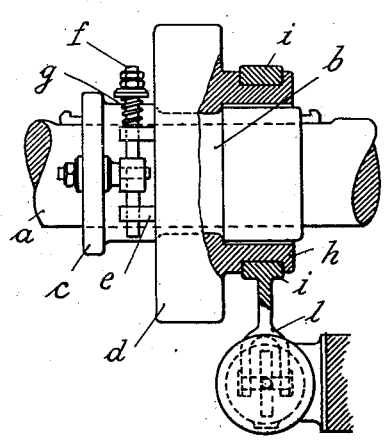

May 12, 1925.  1,537,365

H. MÜLLER
MECHANISM FOR THE AUTOMATIC REGULATION OF THE BRAKING FORCE OF
COMPRESSED AIR BRAKES
Filed March 21, 1924

Patented May 12, 1925.

1,537,365

UNITED STATES PATENT OFFICE.

HERMANN MÜLLER, OF SIEGEN, GERMANY.

MECHANISM FOR THE AUTOMATIC REGULATION OF THE BRAKING FORCE OF COMPRESSED-AIR BRAKES.

Application filed March 21, 1924. Serial No. 700,911.

*To all whom it may concern:*

Be it known that I, HERMANN MÜLLER, a citizen of the German Republic, residing at Siegen, Germany, have invented certain new and useful Improvements in Mechanism for the Automatic Regulation of the Braking Force of Compressed-Air Brakes, of which the following is a specification.

This invention relates to a mechanism for automatically regulating the braking force of compressed air brakes on railway vehicles to prevent the slipping of the braked wheels on the rails, the regulating of the braking force being effected independently of the usual regulating by hand by the attendants as this latter regulating is frequently effected too late to prevent the considerable damage which results from the slipping of the braked wheels on the rails. This damage consists in that the treads of the wheels are ground out of true whereby the steady running of the cars is impeded, the duration of the cars and of the earth works being considerably reduced.

The automatically acting regulating mechanisms of known type are mounted on the brake axle of the car and they are influenced by the changing state of movement of the axle in such a manner that at the transition from revolution to the state of rest of the axle during the braking the air outlet valve of the brake cylinder is opened so that the brake pressure is reduced whereby the brake shoes are released whereupon the action on the valve ceases. The regulating devices of known type are either centrifugal governors which, according to the state of movement of the brake axle, produce a relative movement between the coupling elements and controls, with the aid of transmission means like levers, traction ropes or the like, the air outlet valve, or the kinetic energy of a rotating ring which, with regard to the brake axle at the stand still of the same during the braking, executes an angular rotation, is utilized to control the air outlet valve of the brake cylinder with the aid of the above-mentioned transmission means.

The mechanisms of known type possess the serious inconvenience that they act directly upon an air outlet valve on the brake cylinder so that—owing to the long distance between the brake cylinder and the brake axles of the car—long mechanical transmission means are required, for which very often there is not sufficient space and which, owing to the great length, become so complicated and difficult to operate that the desired effect fails frequently.

This invention avoids these inconveniences by making the regulating device on the brake axle act directly upon a slide valve arranged in closest proximity to it, said slide valve communicating with the pressure space of the brake cylinder by a pipe conduit or the like which can be easily displaced, the brake pressure in this space being regulated through the intermediary of this pipe conduit. The regulating device itself utilizes for the operation of the slide valve also a rotating ring of known type rotatable around a bearing rigidly connected with the brake axle, but it differs from the regulating mechanisms of known type essentially by the means for transmitting to the valve slide the movement of the rotating ring designed to control the slide valve. It may be especially pointed out that the slide is perfectly relieved and requires consequently only very feeble driving power.

Figure 2:
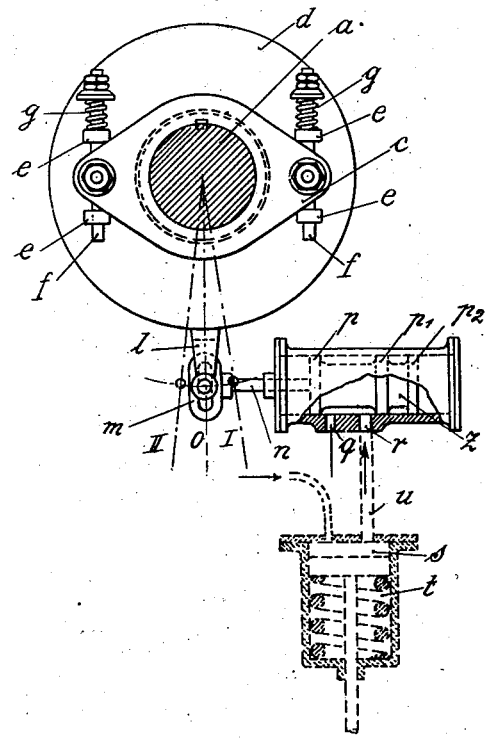
Figure 3:
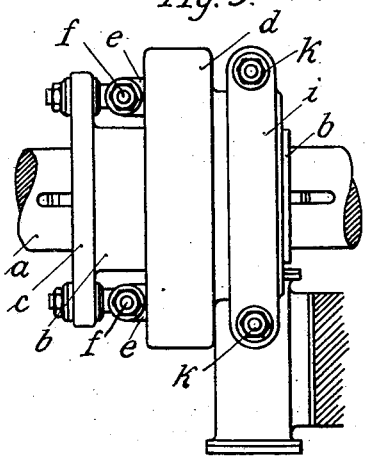

An embodiment of the invention is shown by way of example on the accompanying drawing in which:

Fig. 1 is a front elevation,

Fig. 2 a side elevation viewed from the left,

Fig. 3 a plan view, and

Figure 4:
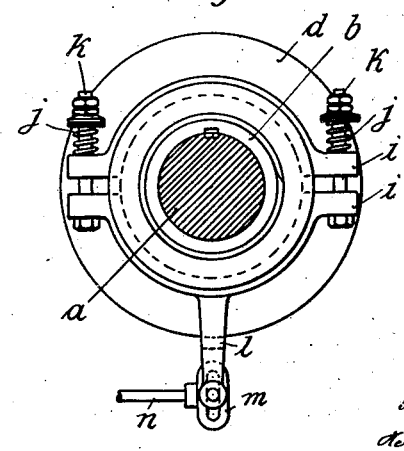

Fig. 4 a side elevation viewed from the right.

On the axle $a$ of the wheels to be braked, which will hereinafter be called the "brake axle," a long sleeve $b$, similar to a hub, is keyed which terminates at one end in a flange $c$. A rotating ring $d$ is loosely mounted on sleeve $b$ at a short distance from the flange $c$. This rotating ring $d$ has four lugs $e$ designed to receive each a bolt $f$ having on its part above the lug a spring $g$. This arrangement serves to couple the rotating ring $d$ with the sleeve $b$ however in such a manner that, under conditions which will be hereinafter explained, it may execute a relative movement with regard to the axle $a$. The rotating ring $d$ has a neck bearing $h$ on which a sliding ring $i$ composed of two parts is mounted after the manner of a Proney brake. Bearing brasses of the sliding ring $i$ are separated from one another by a gap and pressed the one against the other by the action of springs $j$ mounted on bolts $k$. The tension of the springs is adjustable so that the friction moment acting upon the sliding ring may be regulated. All the ring-shaped or sleeve-shaped elements mounted on the axle are made of two parts so that they can be easily mounted on the axle. An arm $l$ of the sliding ring engages with a slit of an eye $m$ of a valve rod which belongs to a relieved piston valve $z$ with packing rings $p$, $p'$ and $p^2$. In the valve casing radial ports $q$ and $r$ are arranged. The ports $r$ are connected with the pressure space $s$ of the brake cylinder $t$ by a tubular conduit $u$, and the ports $q$ communicate with the atmosphere. Owing to the packing rings $p$, $p'$, $p^2$ the ports of the casing may either, at a determined zero position (Fig. 2), be connected with one another or shut off as soon as the piston valve arrives in the position I or II. The valve casing is fixed on the frame of the car. The eye $m$ of the push rod $u$ has a longitudinal slit in order to ensure that the movements of the car frame with regard to the corresponding wheel- or brake axle does not influence the connection between the push rod and the sliding ring. When the axle $a$ revolves in any direction the rotating ring $d$, the sliding ring $i$ and the piston valve are drawn along into the positions I and II. These positions are determined by the end plates of the valve casing which serve as stops. The sliding ring will evidently slide upon the rotating ring during the revolution of the brake axle. When the axle $a$ is suddenly stopped during the braking, when the braked wheels are sliding, the rotating ring $d$ continues to rotate by the action of its kinetic energy and puts under tension one of the springs $g$ on the connecting bolts $f$. When the rotation of the rotating ring ceases this rotating ring is returned to the zero position (Fig. 2) by the action of the expanding spring. The sliding ring $i$ will participate in this return movement and adjust the piston valve $z$ to the zero position whereby air is made to flow out of the brake cylinder until the brake shoes are released and the axle $a$ begins to revolve again, the piston valve $z$ being returned by the sliding ring immediately into two positions I or II.

I claim:—

1. A mechanism for the automatical regulation of the braking force of compressed air brakes for railway cars designed to prevent the slipping of the braked wheels on the rails, comprising in combination with the brake cylinder and with the brake axle, a relieved piston valve, a casing of said piston valve fixed on the frame of the car, a tubular conduit connecting said valve casing with the pressure space of the brake cylinder, a rotating ring on the brake axle, a sliding ring loosely mounted on said rotating ring, and means for connecting said sliding ring with said relieved piston valve so that said piston valve regulates the air pressure in the brake cylinder owing to the displacements in the casing within determined limits.

2. A mechanism for the automatical regulation of the braking force of compressed air brakes for railway cars designed to prevent the slipping of the braked wheels on the rails, comprising in combination with the brake cylinder and with the brake axle, a relieved piston valve, a casing of said piston valve having two ports one of which communicating with the atmosphere fixed on the frame of the car, a tubular conduit connecting said second mentioned port of the valve casing with the pressure space of the brake cylinder, a rotating ring on the brake axle, spring controlled means for movably fixing said rotating ring on the brake axle, a sliding ring loosely mounted on said rotating ring so that at the starting of the car in any direction said sliding ring is drawn along by said rotating ring for a part revolution, and means for connecting said sliding ring with said relieved piston valve so that said sliding ring at its part revolution brings said piston valve into a position in which the port of the casing communicating with the pressure space of the brake cylinder is closed which port, when the brake axle stops suddenly during the braking, will be automatically opened by said sliding ring which is revolved back by the action of the spring of the rotating ring released by the sudden stop of the brake axle.

3. A mechanism for the automatical regulation of the braking force of compressed air brakes for railway cars designed to prevent the slipping of the braked wheels on the rails, comprising in combination with the brake cylinder and with the brake axle, a relieved piston valve, a casing of said piston valve having two ports one of which communicating with the atmosphere fixed on the frame of the car, a tubular conduit connecting said second mentioned port of the valve casing with the pressure space of the brake cylinder, a rotating ring on the brake axle, spring controlled means for movably fixing said rotating ring on the brake axle, a sliding ring loosely mounted on said rotating ring so that at the starting of the car in any direction said sliding ring is drawn along by said rotating ring for a part revolution, the movement of the sliding ring being determined by the stroke of the piston valve which is stopped in either direction by the end walls of the casing, and means for connecting said sliding ring with said relieved piston valve so that said sliding ring at its part revolution brings said piston valve into a position in which the port of the casing communicating with the pressure space of the brake cylinder is closed which port, when the brake axle stops suddenly during the braking, will be automatically opened by said sliding ring which is revolved back by the action of the spring of the rotating ring released by the sudden stop of the brake axle.

4. A mechanism for the automatical regulating of the braking force of compressed air brakes for railway cars designed to prevent the slipping of the braked wheels on the rails, comprising in combination with the brake cylinder and with the brake axle, a bearing of the brake axle, a relieved piston valve, a casing of said piston valve having two ports one of which communicating with the atmosphere fixed on the frame of the car, a tubular conduit connecting said second mentioned port of the valve casing with the pressure space of the brake cylinder, a rotating ring on the brake axle, radial arms of said rotating ring, a radial arm of said bearing of the brake axle, bolts one at either side traversing said radial arms of the rotating ring and of the bearing, compressible springs inserted between one of said radial arms of the rotating ring, a sliding ring loosely mounted on said rotating ring so that at the starting of the car in any direction said sliding ring is drawn along by said rotating ring for a part revolution, and means for connecting said sliding ring with said relieved piston valve so that said sliding ring at its part revolution brings said piston valve into a position in which the port of the casing communicating with the pressure space of the brake cylinder is closed which port, when the brake axle stops suddenly during the braking, will be automatically opened by said sliding ring which is revolved back by the action of the spring of the rotating ring released by the sudden stop of the brake axle.

In testimony whereof I affix my signature in presence of two witnesses.

HERMANN MÜLLER.

Witnesses:
 WILHELM RUEIP,
 CARL KHOLL.